United States Patent
Suzuki

(10) Patent No.: US 9,002,630 B2
(45) Date of Patent: Apr. 7, 2015

(54) ROAD SHAPE ESTIMATION APPARATUS

(75) Inventor: Koji Suzuki, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 104 days.

(21) Appl. No.: 13/877,271

(22) PCT Filed: Nov. 4, 2010

(86) PCT No.: PCT/JP2010/006489
§ 371 (c)(1),
(2), (4) Date: Apr. 1, 2013

(87) PCT Pub. No.: WO2012/059955
PCT Pub. Date: May 10, 2012

(65) Prior Publication Data
US 2013/0218448 A1    Aug. 22, 2013

(51) Int. Cl.
*G05D 1/02* (2006.01)
*G06F 17/10* (2006.01)
(Continued)

(52) U.S. Cl.
CPC .............. *G06F 17/00* (2013.01); *G01S 13/931* (2013.01); *G08G 1/167* (2013.01); *G06K 9/00798* (2013.01); *G06K 9/4638* (2013.01);
(Continued)

(58) Field of Classification Search
CPC ..... B62D 15/025; G01S 13/931; G06F 17/00; G06K 9/00798; G06K 9/4638; G08G 1/167
USPC ......... 701/1, 45, 93, 300, 301, 304, 305, 309, 701/515
See application file for complete search history.

(56) References Cited

U.S. PATENT DOCUMENTS 6,553,283 B2 *  4/2003  Shirai et al. ........................ 701/1
6,567,039 B2 *  5/2003  Shirai et al. ..................... 342/70
(Continued)

FOREIGN PATENT DOCUMENTS

DE    10 2004 003 850 A1    8/2005
DE    10 2007 020 791 A1    11/2007
(Continued)

OTHER PUBLICATIONS

International Preliminary Report on Patentability Issued Oct. 1, 2012 in PCT/JP10/006489 Filed Nov. 4, 2010.
(Continued)

*Primary Examiner* — Jason Holloway
*Assistant Examiner* — Rachid Bendidi
(74) *Attorney, Agent, or Firm* — Oblon, McClelland, Maier & Neustadt, L.L.P.

(57) ABSTRACT

A road shape estimation apparatus, mounted to a vehicle, for estimating a shape of a road on which the vehicle runs, includes: an object detection section for detecting, as a plurality of detected points, a position of a stationary object which is around the vehicle; a starting point determination section for determining a starting point by selecting from among the plurality of detected points, based on a positional relationship between the vehicle and each of the plurality of detected points; a detected point connection section for sequentially connecting between the starting point and one of the detected points that is a point to be connected, so as to start from the starting point, and for thus grouping detected points; and a road shape estimation section for estimating, as a shape of the road, a shape of a connection line obtained by grouping the detected points.

7 Claims, 14 Drawing Sheets

(51) Int. Cl.

| | | |
|---|---|---|
| *G06G 7/78* | (2006.01) | |
| *G06F 17/00* | (2006.01) | |
| *G01S 13/93* | (2006.01) | |
| *G08G 1/16* | (2006.01) | |
| *G06K 9/00* | (2006.01) | |
| *G06K 9/46* | (2006.01) | |
| *B62D 15/02* | (2006.01) | |
| *G01S 7/41* | (2006.01) | |

(52) U.S. Cl.
CPC .............. *B62D15/025* (2013.01); *G01S 7/412* (2013.01); *G01S 2013/9353* (2013.01); *G01S 2013/9321* (2013.01); *G01S 2013/9342* (2013.01); *G01S 2013/9346* (2013.01); *G01S 2013/9375* (2013.01)

(56) References Cited

U.S. PATENT DOCUMENTS

| | | | |
|---|---|---|---|
| 7,000,721 B2* | 2/2006 | Sugawara et al. | 180/169 |
| 7,349,771 B2* | 3/2008 | Sakuma | 701/1 |
| 2001/0053955 A1* | 12/2001 | Shirai et al. | 701/200 |
| 2007/0143004 A1* | 6/2007 | Sakuma | 701/200 |
| 2007/0265777 A1* | 11/2007 | Munakata | 701/301 |
| 2009/0248299 A1* | 10/2009 | Fukumoto et al. | 701/208 |
| 2009/0248768 A1* | 10/2009 | Fukumoto et al. | 708/207 |
| 2010/0169015 A1 | 7/2010 | Tsunekawa et al. | |
| 2010/0250064 A1 | 9/2010 | Ota et al. | |
| 2011/0235861 A1* | 9/2011 | Nitanda | 382/103 |
| 2011/0264302 A1* | 10/2011 | Tsunekawa | 701/1 |
| 2012/0290184 A1* | 11/2012 | Suzuki | 701/93 |

FOREIGN PATENT DOCUMENTS

| | | |
|---|---|---|
| DE | 10 2009 009 211 A1 | 9/2009 |
| JP | 2004 271513 | 9/2004 |
| JP | 2006 119026 | 5/2006 |
| JP | 2007 161162 | 6/2007 |
| JP | 2007 230267 | 9/2007 |
| JP | 2008 40819 | 2/2008 |
| JP | 2008 74401 | 4/2008 |
| JP | 2008 168698 | 7/2008 |
| JP | 2009 237773 | 10/2009 |
| JP | 2010 156567 | 7/2010 |
| JP | 2010 221909 | 10/2010 |
| JP | 2011 248638 | 12/2011 |
| JP | 4968412 | 7/2012 |

OTHER PUBLICATIONS

Written Opinion Issued May 22, 2012 in PCT/JP10/006489 Filed Nov. 4, 2010.

International Search Report Issued Feb. 1, 2011 in PCT/JP10/06489 Filed Nov. 4, 2010.

* cited by examiner

ROAD SHAPE ESTIMATION APPARATUS

TECHNICAL FIELD

The present invention relates to road shape estimation apparatuses, and more particularly to road shape estimation apparatuses, mounted to vehicles, for estimating shapes of roads on which the vehicles are running.

BACKGROUND ART

In-vehicle systems that estimate shapes of roads on which the vehicles are running, to control steering of the vehicles, and/or warn of risks of collision of vehicles according to the shapes of the roads, have been developed to date. In the in-vehicle systems as described above, shapes of roads need to be accurately estimated in order to appropriately control the vehicles. Such an apparatus for estimating a shape of a road is disclosed in, for example, Patent Literature 1.

An in-vehicle road shape identification apparatus disclosed in Patent Literature 1 detects a position and shape of a roadside stationary object such as a guard rail, based on a plurality of detected points which are obtained by a radio wave radar. Specifically, the in-vehicle road shape identification apparatus extracts a group of detected points which are formed by adjacent detected points, from the plurality of detected points which are obtained by the radio wave radar, and detects the group of detected points as the roadside stationary object such as a guard rail. In general, the roadside stationary object such as a guard rail is positioned along a road on which the vehicle runs and has a shape similar to that of the road. Therefore, the in-vehicle road shape identification apparatus is allowed to estimate and calculate the shape of the road based on the shape of the group of detected points representing the roadside stationary object, such as s guard rail, as detected in the above-described manner.

CITATION LIST

Patent Literature

Patent Literature 1: Japanese Laid-Open Patent Publication No. 2007-161162

SUMMARY OF THE INVENTION

Problems to be Solved by the Invention

The in-vehicle system that controls steering of a vehicle, and/or warns of a risk of collision of vehicles according to a shape of a road as described above, needs to perform a quick control based on the shape of the road which changes from moment to moment according to travelling of the vehicle. Namely, a road shape identification apparatus is required which is capable of quickly estimating, with an accuracy, a shape of a road on which the vehicle is travelling. However, a conventional road shape identification apparatus is less likely to calculate a shape of a road with sufficient quickness.

Specifically, the in-vehicle road shape identification apparatus as disclosed in Patent Literature 1 simply groups points which are within a predetermined distance in a predetermined direction. The enormous number of detected points may be obtained by a radio wave radar. In a case where the grouping process as described above is sequentially performed based on all the detected points, an amount of process may be enormously increased. Namely, a time required for the grouping process is increased, and it is difficult to estimate a shape of a road in real time.

Further, in a case where an expensive processing apparatus that performs a high speed calculation process is used in view of these situations, a problem may arise that cost of commodities is increased.

The present invention is made in order to solve the aforementioned problem, and an object of the present invention is to make available a road shape estimation apparatus capable of quickly estimating a shape of a road at low cost.

Solution to the Problems

Specifically, a first aspect is directed to a road shape estimation apparatus, mounted to a vehicle, for estimating a shape of a road on which the vehicle runs, and the road shape estimation apparatus includes: an object detection section for detecting, as a plurality of detected points, a position of a stationary object which is around the vehicle; a starting point determination section for determining a starting point that is likely to represent a portion of the road, by selecting from among the plurality of detected points, based on a positional relationship between the vehicle and each of the plurality of detected points; a detected point connection section for sequentially connecting between the starting point and one of the detected points that is a point to be connected, so as to start from the starting point, and for thus grouping detected points; and a road shape estimation section for estimating, as a shape of the road, a shape of a connection line obtained by grouping the detected points.

According to a second aspect based on the first aspect, a starting point candidate selection section for selecting, as starting point candidates, points that satisfy predetermined conditions, from among the detected points, is further provided, and the starting point determination section determines, as the starting point, a point closest to the vehicle in distance, by selecting from among the starting point candidates.

According to a third aspect based on the second aspect, a storage section for storing information of the detected points detected by the object detection section is further provided, the starting point candidate selection section includes a reliability determination section for calculating a reliability representing a possibility that each detected point represents a roadside stationary object positioned along the road, based on previous positions of the detected points which are stored in the storage section, and determining whether or not the reliability represents a value greater than or equal to a predetermined threshold value, and the starting point candidate selection section selects, as the starting point candidates, each detected point that satisfies, as one of the predetermined conditions, a condition that the reliability of said detected point is determined, by the reliability determination section, to represent a value greater than or equal to the predetermined threshold value.

According to a fourth aspect based on the third aspect, an extrapolation processing section for extrapolating, based on information of the detected points which have been previously obtained and stored in the storage section, current positions of the detected points which have been previously obtained, as the detected points, is further provided, and the starting point candidate selection section selects, as the starting point candidates, points that satisfy the predetermined conditions, from among the detected points that have been actually detected by the object detection section, and the detected points that have been extrapolated by the extrapolation processing section.

According to a fifth aspect based on the fourth aspect, when the detected points are points extrapolated by the extrapolation processing section, the reliability determination section calculates the reliability of each detected point as a relatively small value, and when the detected points are points that are actually detected by the object detection section, the reliability determination section calculates the reliability of each detected point as a relatively great value.

According to a sixth aspect based on one of the second to the fifth aspects, the starting point candidate selection section includes a region determination section for determining whether or not the detected points are outside an elimination region that is predetermined in front of the vehicle, and the starting point candidate selection section selects, as the starting point candidates, the detected points that satisfy, as one of the predetermined conditions, a condition that said detected points are determined, by the region determination section, to be outside the elimination region that is predetermined in front of the vehicle.

According to a seventh aspect based on the sixth aspect, the elimination region is a region that extends forward of the vehicle like a band, and that has a width greater than or equal to a width of the vehicle.

According to an eighth aspect based on one of the first to the seventh aspects, the detected point connection section includes: a connection range setting section for setting a connection range in which one of the detected points is to be found as the point to be connected, based on one of the detected points that is a connection starting point, according to a position of the connection starting point; a point-to-be-connected selection section for selecting, as the point to be connected, a point closest in distance to one of the detected points that is the connection starting point, from among the detected points in the connection range; and a line segment connection section for connecting, as a line segment, between one of the detected points that is the connection starting point and one of the detected points that is the point to be connected, and setting the point to be connected, as a new connection starting point.

According to a ninth aspect based on the eighth aspect, the connection range setting section sets the connection range such that the greater a distance to the vehicle from one of the detected points that is a reference for setting the connection range is, the greater the connection range is.

According to a tenth aspect based on the eighth aspect or the ninth aspect, the connection range is a rectangular region as viewed in a planar manner, and the connection range setting section sets the connection range by rotating the connection range to be set this time, according to a direction indicated by the line segment connected to the connection starting point.

An eleventh aspect is directed to a road shape estimation method, implemented in a vehicle, for estimating a shape of a road on which the vehicle runs, and the road shape estimation method includes: an object detection step of detecting, as a plurality of detected points, a position of a stationary object which is around the vehicle; a starting point determination step of determining a starting point by selecting from among the plurality of detected points, based on a positional relationship between the vehicle and each of the plurality of detected points; a detected point connection step of sequentially connecting between the starting point and one of the detected points that is a point to be connected, so as to start from the starting point, and of thus grouping detected points; and a road shape estimation step of estimating, as a shape of the road, a shape of a connection line obtained by grouping the detected points.

Advantageous Effects of the Invention

According to the first aspect, a shape of a road can be quickly estimated at low cost. Specifically, the detected points are sequentially connected from an appropriately determined starting point to group the detected points, and therefore a grouping process based on all the detected points need not be performed unlike in conventional arts. Namely, an unnecessary grouping process may not be performed, thereby enabling an amount of process to be reduced. Therefore, a time required for estimating a shape of a road can be reduced as compared to in conventional arts.

According to the second aspect, the starting point can be appropriately determined, and a shape of a road can be accurately estimated. In a case where a stationary object is detected by using, for example, a radar device as the object detection section, variation in position is smaller in the detected points which are relatively closer to a vehicle than in the detected points that are relatively farther from the vehicle, and the detected points which are relatively closer to the vehicle are likely to represent a position of an object with an enhanced accuracy. Therefore, by the detected point which is relatively closer to the vehicle in distance being set as the starting point, a shape of a roadside stationary object can be accurately detected, and a shape of a road which may be similar thereto can be accurately estimated.

According to the third aspect, the starting point can be determined with an enhanced appropriateness. Specifically, the detected points which are determined to be less likely to represent a roadside stationary object, based on change of previous positions, are eliminated from the starting point candidates, and the detected point which is determined to be likely to represent the roadside stationary object is used as the starting point.

According to the fourth aspect, even when a point representing a stationary object, which has been continuously detected, is temporarily undetected as the detected point due to an influence of a noise or the like, a position of the point to be currently detected as the detected point is estimated, and the point can be processed as if the point is being detected. Therefore, a shape of a roadside stationary object can be detected with an enhanced accuracy.

According to the fifth aspect, the reliability can be calculated in a simplified process.

According to the sixth and the seventh aspects, the starting point can be determined with an enhanced appropriateness. Specifically, it is assumed that no roadside object is in front of a vehicle. Therefore, by the detected points which are in a predetermined region in front of the vehicle being eliminated from the starting point candidates, the detected point which is likely to represent a roadside stationary object can be used as the starting point.

According to the eighth aspect, a shape of a road can be estimated with an enhanced accuracy. Specifically, by setting the connection range in which a point to be connected is to be detected according to a position of the detected point that is the connection starting point, even when, for example, a road is curved and a roadside stationary object is curved along the road, the connection range can be set according to the curve. Therefore, the detected points having been appropriately obtained can be sequentially connected, and a shape of a roadside stationary object can be accurately detected, to accurately estimate a shape of a road which may be similar thereto.

According to the ninth aspect, the connection range can be appropriately set. Specifically, when the object detection section is implemented as a radar device or the like, it is assumed that the object detection section has a tendency that the farther an object is from the radar device, the lower an angular resolution for the object is. Namely, it is assumed that intervals at which the detected points are obtained are increased in a relatively far portion. Therefore, in a case where the detected points which are relatively far are connected to each other, the detected point that is the point to be connected is preferably found in a greater range as compared to in a case where the detected points which are relatively near are connected to each other. Therefore, the size of a range for the finding is changed according to a distance to the vehicle from the detected point that is a reference, thereby enabling the connection range to be appropriately set and the detected points to be favorably connected to each other.

According to the tenth aspect, the connection range can be appropriately set. Specifically, it is assumed that the detected points which are near an extended line of a connection line obtained by a group of detected points being sequentially connected, are likely to represent a portion of a stationary object as represented by the group of detected points. Therefore, by the connection range being set according to a direction indicated by the line segment having been previously connected, the detected points which are likely to represent the same stationary object are likely to be connected, thereby enabling a shape of a roadside stationary object to be accurately detected.

According to the eleventh aspect, the same effect as in the first aspect can be obtained.

DESCRIPTION OF EMBODIMENTS

Hereinafter, a road shape estimation apparatus 1 according to an embodiment of the present invention will be described. The road shape estimation apparatus 1 according to the present invention is an apparatus, mounted to an own vehicle 100, for estimating a shape of a road on which the own vehicle 100 runs. Hereinafter, a road on which the own vehicle 100 runs is referred to as an own vehicle running road.

Figure 1:
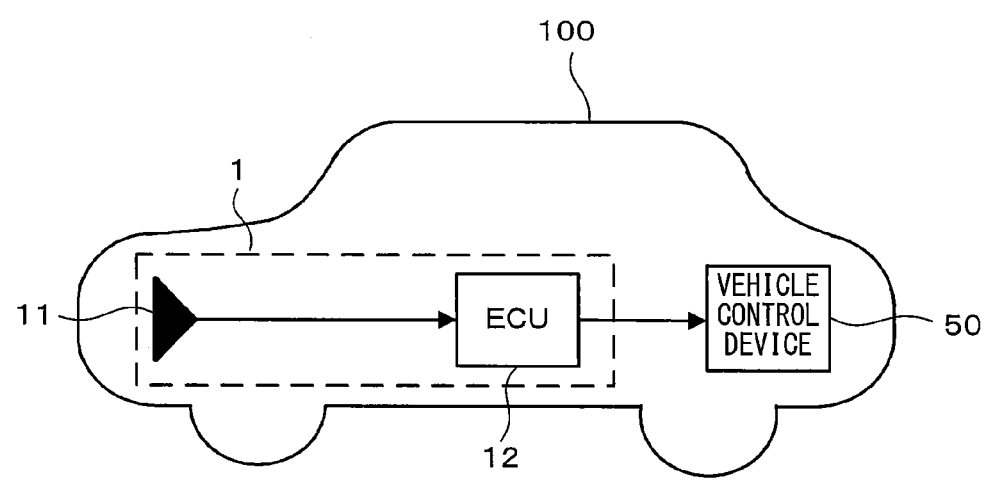
FIG. 1 is a block diagram illustrating an exemplary configuration of a road shape estimation apparatus 1.

Firstly, a hardware configuration of the road shape estimation apparatus 1 will be described with reference to FIG. 1. FIG. 1 is a block diagram illustrating an exemplary configuration of the road shape estimation apparatus 1 according to the embodiment of the present invention. As shown in FIG. 1, the road shape estimation apparatus 1 includes a radar device 11 and an ECU 12. The ECU 12 is electrically connected to a vehicle control device 50 mounted to the own vehicle 100.

Figure 2:
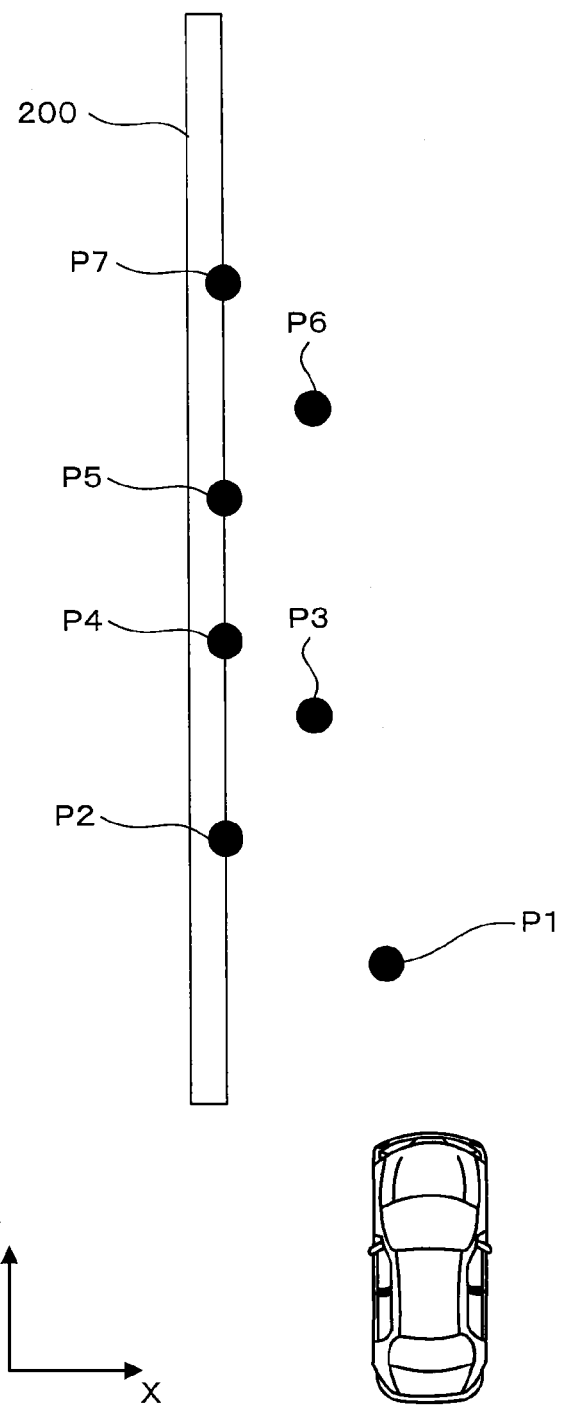
FIG. 2 illustrates exemplary points having been directly detected as detected points by a radar device.

The radar device 11 is a device for detecting, as a plurality of detected points, a position of, for example, a stationary object around the own vehicle 100 as shown in FIG. 2. Namely, the radar device 11 corresponds to an object detection section in claims. FIG. 2 illustrates exemplary points having been directly detected as detected points by the radar device 11. The radar device 11 is mounted to a front end of the own vehicle 100, and detects objects which are in front of the own vehicle 100. The radar device 11 is typically an FM-CW radar device for transmitting and receiving an electromagnetic wave in a millimeter wavelength band. The radar device 11 emits, for example, a detection wave signal such as an electromagnetic wave forward of the own vehicle 100. Based on a reflected wave obtained by the detection wave signal being reflected by an object, a position of the reflection point is detected as a detected point. The radar device 11 obtains positional information of the detected point based on an XY-coordinate system in which the own vehicle 100 is the originating point, an axis line representing a direction in which the own vehicle 100 travels is represented as a Y-axis, and an axis line orthogonal to the Y-axis on a horizontal plane is represented as an X-axis, as shown in FIG. 2. Further, the radar device 11 determines whether or not each detected point represents a stationary object. Specifically, the radar device 11 detects a relative speed of each detected point with respect to the own vehicle 100 by using a conventionally well-known technique. When the relative speed and the speed at which the own vehicle 100 runs are substantially equal to each other, the radar device 11 determines that the detected point represents a stationary object. The above-described technique is an exemplary one, and the radar device 11 may determine whether or not the detected point represents a stationary object by any conventionally well-known technique. The radar device 11 transmits, to the ECU 12, the positional information (XY-coordinate) of the detected point having been determined to represent the stationary object as described above.

FIG. 2 illustrates an exemplary case in which a guard rail 200 is positioned, as a roadside stationary object, along the own vehicle running road. As shown in FIG. 2, the radar device 11 may obtain a detected point for a position at which no stationary object exists, due to influence of a noise and the like (for example, P1, P3, P6).

The ECU 12 is typically an electronic control device including an information processing device such as a CPU (Central Processing Unit), a storage device such as a memory, an interface circuit, and the like. The ECU 12 is electrically connected to the vehicle control device 50.

Figure 3:
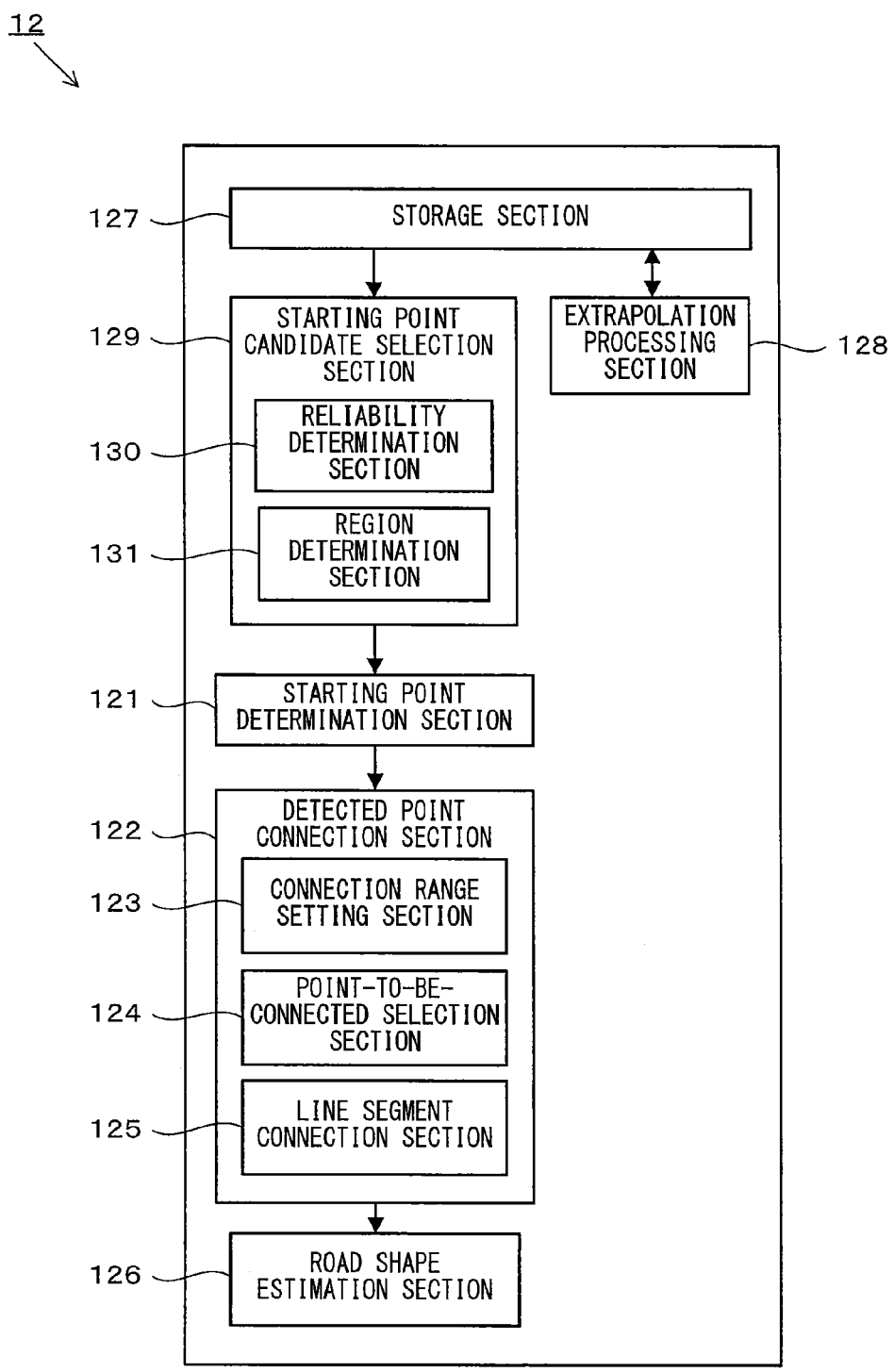
FIG. 3 is a block diagram illustrating an exemplary configuration of functions of an ECU 12.

Hereinafter, a configuration of functions of the ECU 12 will be described with reference to FIG. 3. FIG. 3 is a block diagram illustrating an exemplary configuration of functions of the ECU 12. As shown in FIG. 3, the ECU 12 functionally includes a starting point determination section 121, a detected point connection section 122, a road shape estimation section 126, a storage section 127, an extrapolation processing section 128, and a starting point candidate selection section 129. The detected point connection section 122 includes a connection range setting section 123, a point-to-be-connected selection section 124, and a line segment connection section 125. Further, the starting point candidate selection section 129 includes a reliability determination section 130 and a region determination section 131. The ECU 12 operates as the starting point determination section 121, the detected point connection section 122, the connection range setting section 123, the point-to-be-connected selection section 124, the line segment connection section 125, the road shape estimation section 126, the storage section 127, the starting point candidate selection section 129, the reliability determination section 130, and the region determination section 131 by, for example, causing the CPU to execute a control program which is previously stored in a memory or the like provided in the ECU 12.

The starting point determination section 121 is a functional section for determining a starting point by selecting from among a plurality of detected points (for example, P1 to P7 in FIG. 2) detected by the radar device 11, based on a positional relationship between the own vehicle 100 and each of the plurality of detected points. The starting point is a point at which a connection line obtained by sequentially connecting between the detected points starts. In the present embodiment, the starting point determination section 121 determines the starting point by selecting from among the detected points which are selected as starting point candidates by the starting point candidate selection section 129.

The detected point connection section 122 is a functional section for sequentially connecting between the starting point and one of the plurality of detected points, so as to form a line segment which starts at the starting point and connects to the one of the plurality of detected points as a point to be connected. The connection range setting section 123 is a functional section for setting, based on a detected point (for example, Pa, Pb, and Pc in FIG. 11) that is a connection starting point, a connection range (for example, Aa, Ab, and Ac in FIG. 11) in which a detected point as the point to be connected is to be found. The point-to-be-connected selection section 124 is a functional section for selecting, as a detected point that is the point to be connected, a point (for example, Pd in FIG. 11) that is closest in distance to the detected point that is the connection starting point, from among the detected points (for example, Pd and Pe in FIG. 11) in the connection range (for example, Ac in FIG. 11) having been set by the connection range setting section 123. The line segment connection section 125 is a functional section for connecting, as a line segment, between the detected point (for example, Pa in FIG. 11) that is the connection starting point, and the detected point (for example, Pb in FIG. 11) that is the point to be connected, and setting the detected point (for example, Pb in FIG. 11) that is the point to be connected, as a detected point that is a new connection starting point.

The road shape estimation section 126 is a functional section for estimating, as a shape of the own vehicle running road, a shape of the connection line obtained by the detected points being sequentially connected as line segments.

The storage section 127 is a functional section for storing the positional information (XY-coordinates) of the detected points detected by the radar device 11. The starting point candidate selection section 129 is a functional section for selecting detected points as the starting point candidates based on determination results from the reliability determination section 130 and the region determination section 131. The reliability determination section 130 is a functional section for calculating a value of a reliability R representing a possibility that a detected point being currently detected represents a roadside stationary object positioned along the own vehicle running road, and determining whether or not the reliability R indicates a value greater than or equal to a predetermined threshold value. The region determination section 131 is a functional section for determining whether or not the detected point is outside a predetermined elimination region Aex (see FIG. 9) which is set in front of the vehicle.

Returning to the description with reference to FIG. 1, the vehicle control device 50 is a control device which acts as, for example, a brake control device, a steering control device, and a warning device. For example, the brake control device, the steering control device, and the warning device control a direction in and a speed at which the own vehicle 100 travels, so as to prevent the own vehicle 100 from deviating from the own vehicle running road, and/or predict the deviation to issue a warning to a driver of the own vehicle 100, according to a shape of the own vehicle running road obtained from the ECU 12. The vehicle control device 50 can execute an appropriate vehicle control by the ECU 12 accurately detecting the shape of the own vehicle running road.

Figure 4:
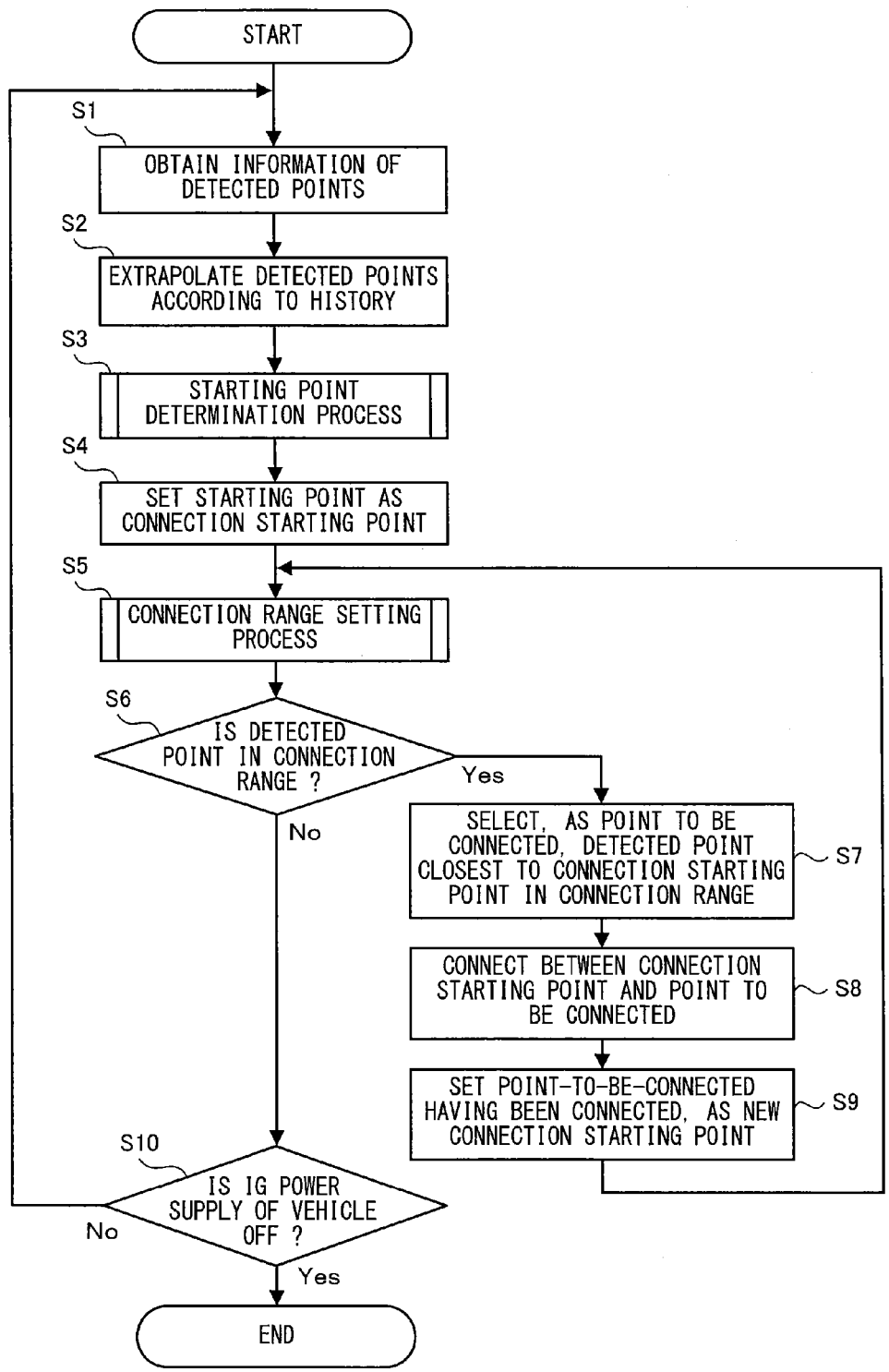
FIG. 4 is a flow chart showing in detail an exemplary process executed by functional sections of the ECU 12.

Next, a process executed by the ECU 12 will be described with reference to FIG. 4. FIG. 4 is a flow chart showing in detail an exemplary process executed by each functional section of the ECU 12. The ECU 12 starts the process of the flow chart shown in FIG. 4 when, for example, an IG power supply of the own vehicle 100 is set to be on. The ECU 12 firstly executes a process step of step S1 when starting the process of the flow chart shown in FIG. 4.

In step S1, the storage section 127 obtains, from the radar device 11, information of detected points of a stationary object. The storage section 127 stores the obtained positional information of the detected points, so as to be associated with a time T(n) at which the sampling has been performed. The greater the number n represented as the suffix in parentheses ( ) is, the more recent the time T(n) is. When the storage section 127 has completed the process step of step S1, the process is advanced to step S2.

In step S2, the extrapolation processing section 128 extrapolates a position of the detected point to be currently obtained, based on history information of the detected points which have been previously obtained and stored in the storage section 127. The extrapolation is a technique of estimating a position of the detected point to be obtained in the current sampling, according to, for example, a position and relative speed of the detected point having been obtained in a previous sampling, and presuming, when no detected point is obtained near the estimated position, that the detected point is actually at the estimated position. The extrapolation processing section 128 may extrapolate the position of the detected point by using any well-known technique. Hereinafter, the detected point having been extrapolated in the process step of step S2 is referred to as an extrapolated point. On the other hand, a point having been directly detected as the detected point by the radar device 11 is referred to as a directly detected point. Positional information of the detected point having been extrapolated in the process step of step S2 is stored in the storage section 127 so as to be associated with extrapolation flag data indicating that the detected point is the extrapolated point. The extrapolated point is also stored so as to be associated with the time T(n) at which the sampling has been performed, similarly to the directly detected point. When the extrapolation processing section 128 has completed the process step of step S2, the process is advanced to step S3.

Figure 5:
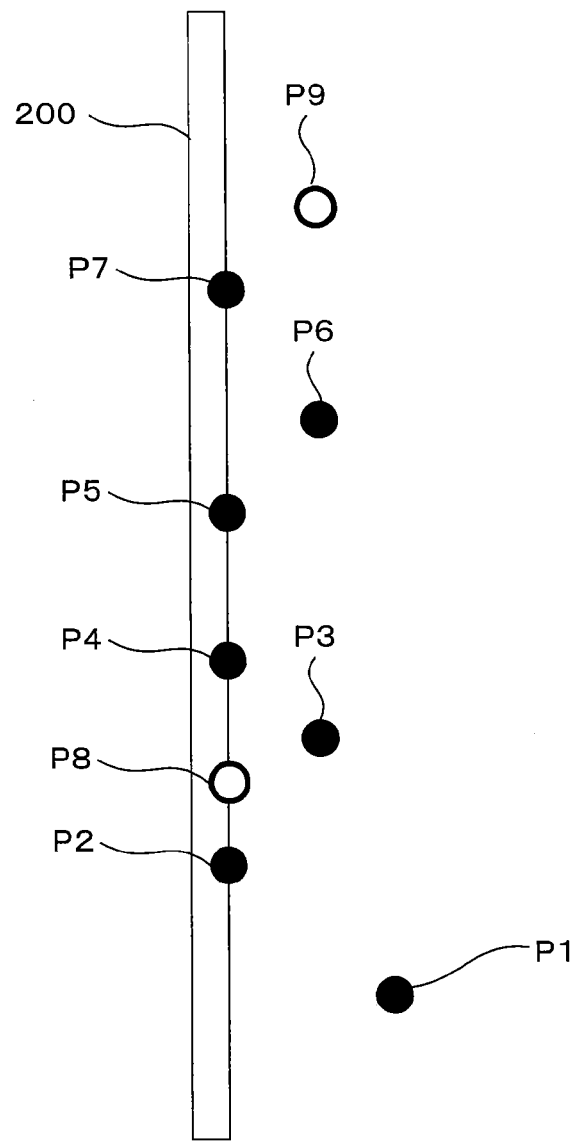
FIG. 5 illustrates a state where points are extrapolated as extrapolated points.

FIG. 5 illustrates a state where the extrapolated points in addition to the directly detected points obtained as shown in FIG. 2 are obtained in the process step of step S2. FIG. 5 illustrates a state where points are extrapolated as the extrapolated points. In FIGS. 5, P8 and P9 are obtained as the extrapolated points by the extrapolation. In the process step of step S2, even in a case where, although detected points of a stationary object have been continuously obtained, the obtaining of the detected point of the stationary object is temporarily unexecuted due to an influence of a noise or the like, a position of the detected point to be currently obtained can be estimated and the position can be regarded as having been obtained. Therefore, a shape of a roadside stationary object can be detected with an enhanced accuracy.

Figure 6:
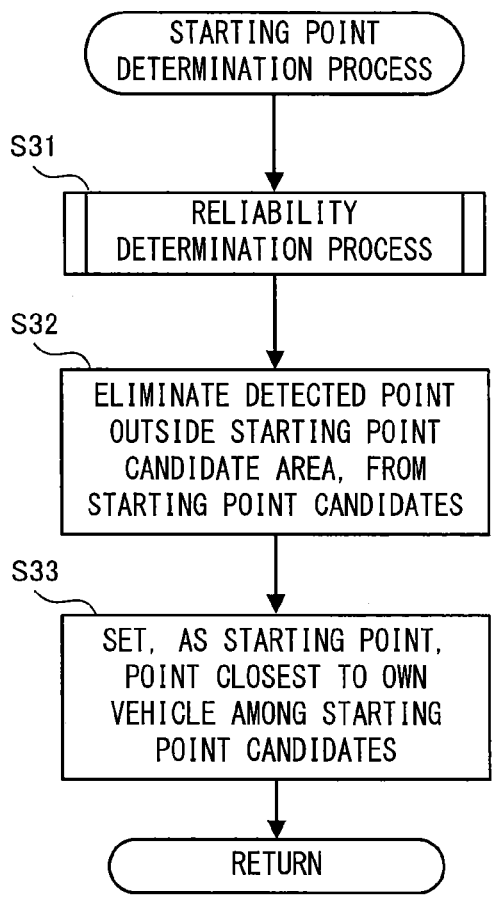
FIG. 6 is a flow chart showing in detail an exemplary starting point determination process executed by a starting point determination section 121.

In step S3, the starting point determination section 121 executes a starting point determination process. The starting point determination process is a process for determining a starting point by selecting from among a plurality of detected points. Hereinafter, the starting point determination process executed by the starting point determination section 121 will be described with reference to FIG. 6. FIG. 6 is a flow chart showing in detail an exemplary starting point determination process executed by the starting point determination section 121. The starting point determination section 121 firstly executes the process step of step S31 when starting the process of the flow chart shown in FIG. 6.

Figure 7:
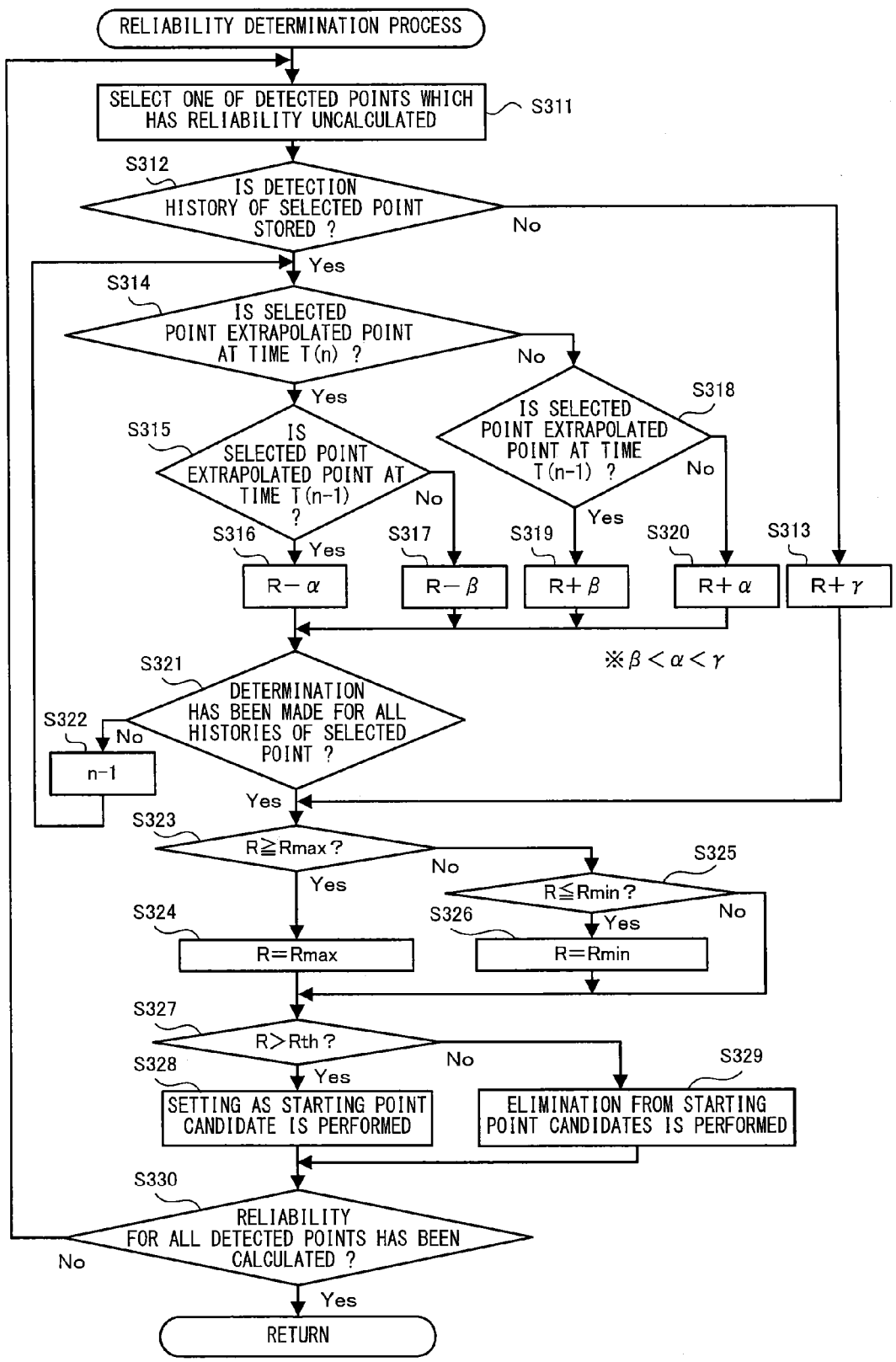
FIG. 7 is a flow chart showing in detail an exemplary reliability determination process executed by a reliability determination section 130.

In step S31, the reliability determination section 130 executes a reliability determination process. The reliability determination process is a process for determining whether or not each of the detected points being currently detected is likely to represent a roadside stationary object positioned along the own vehicle running road. Hereinafter, the reliability determination process executed by the reliability determination section 130 will be described with reference to FIG. 7. FIG. 7 is a flow chart showing in detail an exemplary reliability determination process executed by the reliability determination section 130. The reliability determination section 130 firstly executes the process step of step S311 when starting the process of the flow chart shown in FIG. 7.

In step S311, the reliability determination section 130 selects one detected point having the reliability R uncalculated, from among the detected points which are being currently detected actually and the detected points having been extrapolated. Hereinafter, the detected point selected in step S311 is referred to as a selected point. When the reliability determination section 130 has completed the process step of step S311, the process is advanced to step S312.

In step S312, the reliability determination section 130 determines whether or not a detection history of the selected point is stored. Specifically, whether or not information of detected points which have been previously obtained and stored in the storage section 127 includes information representing the same object as that represented by the selected point. When the selected point represents a stationary object, the position thereof changes with the passage of time according to a speed at which the own vehicle 100 runs. Therefore, the reliability determination section 130 estimates, for example, a position, in the previous sampling, which may correspond to the selected point, based on the current position of the selected point and a speed at which the own vehicle 100 runs. When a history of the detected point having been obtained near the estimated position in the previous sampling is stored in the storage section 127, the reliability determination section 130 determines that the history is a detection history of the selected point. The reliability determination section 130 may determine whether or not the detection history of the selected point is stored, in any conventionally well-known technique other than the technique described above. When the reliability determination section 130 determines that the detection history of the selected point is stored, the process is advanced to step S314. On the other hand, when the reliability determination section 130 determines that the detection history of the selected point is not stored, the process is advanced to step S313.

In step S313, the reliability determination section 130 adds a constant $\gamma$ to the reliability R. The constant $\gamma$ is any predetermined positive constant value. The constant $\gamma$ is preset as, for example, 30. When the reliability determination section 130 has completed the process step of step S313, the process is advanced to step S323.

In step S314, the reliability determination section 130 determines whether or not the selected point obtained at the time T(n) is an extrapolated point. Specifically, determination is made according to whether or not the extrapolation flag data for the selected point obtained at the time T(n) is stored in the storage section 127. When the process step of step S314 is executed firstly after the reliability determination process is started, whether or not the selected point obtained at the current time T(k) is the extrapolated point, is determined. When the reliability determination section 130 determines that the selected point obtained at the time T(n) is the extrapolated point, the process is advanced to step S315. On the other hand, when the reliability determination section 130 determines that the selected point is a directly detected point, the process is advanced to step S318.

In step S315, the reliability determination section 130 determines whether or not the selected point has been the extrapolated point at a time T(n−1) in the immediately preceding sampling. Specifically, the determination is made according to whether or not the extrapolation flag data for the selected point obtained at the time T(n−1) in the immediately preceding sampling is stored being determined with reference to the storage section 127. When the reliability determination section 130 determines that the selected point has been the extrapolated point at the time T(n−1) in the immediately preceding sampling, namely, determines that the extrapolated points have been successively obtained, the process is advanced to step S316. On the other hand, when the reliability determination section 130 determines that the selected point has been the directly detected point at the time T(n−1) in the immediately preceding sampling, the process is advanced to step S317.

In step S316, the reliability determination section 130 subtracts a constant $\alpha$ from the reliability R. The constant $\alpha$ is any predetermined positive constant value which is less than $\gamma$. The constant $\alpha$ is preset as, for example, 20. An initial value of the reliability R may be any value such as zero. When the reliability determination section 130 has completed the process step of step S316, the process is advanced to step S321.

In step S317, the reliability determination section 130 subtracts a constant $\beta$ from the reliability R. The constant $\beta$ is any positive constant value which is less than $\alpha$. The constant $\beta$ is preset as, for example, 10. When the reliability determination section 130 has completed the process step of step S317, the process is advanced to step S321.

In step S318, the reliability determination section 130 determines whether or not the selected point has been the extrapolated point at the time T(n−1) in the immediately preceding sampling in the same manner as in step S315. When the reliability determination section 130 determines that the selected point has been the extrapolated point at the time T(n-1) in the immediately preceding sampling, the process is advanced to step S319. On the other hand, when the reliability determination section 130 determines that the selected point has been the directly detected point also at the time T(n−1) in the immediately preceding sampling, the process is advanced to step S320.

In step S319, the reliability determination section 130 adds the constant β to the reliability R. When the reliability determination section 130 has completed the process step of step S319, the process is advanced to step S321.

In step S320, the reliability determination section 130 adds the constant α to the reliability R. When the reliability determination section 130 has completed the process step of step S320, the process is advanced to step S321.

In step S321, the reliability determination section 130 determines whether or not the determination process from step S314 to step S320 has been performed for all the histories of the selected point. When the reliability determination section 130 determines that the determination has been made for all the histories of the selected point, the process is advanced to step S323. On the other hand, when the reliability determination section 130 determines that the determination has not been made for all the histories of the selected point, the process is advanced to step S322.

In step S322, the reliability determination section 130 decrements a value of n. When the reliability determination section 130 has completed the process step of step S322, the process is returned to step S314.

In the process from step S312 to step S322, while the reliability determination section 130 sequentially switches the history of the selected point from the most recent history to the previous history, a value of the reliability R of the selected point is increased or decreased according to whether the selected point has been the extrapolated point or the directly detected point at each sampling point of time. More specifically, in a case where the selected point is the extrapolated point, the reliability R is calculated so as to be reduced as compared to in a case where the selected point is the directly detected point. Further, in a case where the selected points have been obtained as extrapolated points continuously in a time sequence, a value of the reliability R is calculated so as to be further reduced.

In step S323, the reliability determination section 130 determines whether the value of the reliability R is greater than or equal to a reliability maximum value Rmax. The reliability maximum value Rmax is a maximum value which the reliability R can take. The reliability maximum value Rmax is a predetermined constant, and is set as, for example, 200. When the reliability determination section 130 determines that the value of the reliability R is greater than or equal to the reliability maximum value Rmax, the process is advanced to step S324. On the other hand, when the reliability determination section 130 determines that the value of the reliability R is less than the reliability maximum value Rmax, the process is advanced to step S325.

In step S324, the reliability determination section 130 sets the value of the reliability R so as to be equal to the reliability maximum value Rmax. When the reliability determination section 130 has completed the process step of step S324, the process is advanced to step S327.

In step S325, whether or not the value of the reliability R is less than or equal to a reliability minimum value Rmin is determined. The reliability minimum value Rmin is a minimum value which the reliability R can take. The reliability minimum value Rmin is a predetermined constant, and is set as, for example, zero. When the reliability determination section 130 determines that the value of the reliability R is less than or equal to the reliability minimum value Rmin, the process is advanced to step S326. On the other hand, when the reliability determination section 130 determines that the value of the reliability R is greater than the reliability minimum value Rmin, the process is advanced to step S327.

In step S326, the reliability determination section 130 sets the value of the reliability R so as to be equal to the reliability minimum value Rmin. When the reliability determination section 130 has completed the process step of step S326, the process is advanced to step S327.

In step S327, the reliability determination section 130 determines whether or not the value of the reliability R is greater than a threshold value Rth. The threshold value Rth is a threshold value according to which whether or not the selected point is to be eliminated from the starting point candidates is determined based on the value of the reliability R. The threshold value Rth is any predetermined constant. When the reliability determination section 130 determines that the value of the reliability R is greater than the threshold value Rth, the process is advanced to step S328. On the other hand, when the reliability determination section 130 determines that the value of the reliability R is less than or equal to the threshold value Rth, the process is advanced to step S329.

In step S328, the reliability determination section 130 sets the selected point as the starting point candidate. When the reliability determination section 130 has completed the process step of step S328, the process is advanced to step S330.

In step S329, the reliability determination section 130 eliminates the selected point from the starting point candidates. When the reliability determination section 130 has completed the process step of step S329, the process is advanced to step S330.

In step S330, the reliability determination section 130 determines whether or not the reliability R for all the detected points has been calculated. When the reliability determination section 130 determines that a detected point having the reliability R uncalculated exists, the process is returned to step S311. On the other hand, when the reliability determination section 130 determines that the reliability R for all the detected points has been calculated, the process is advanced to step S32 shown in FIG. 6.

Figure 8:
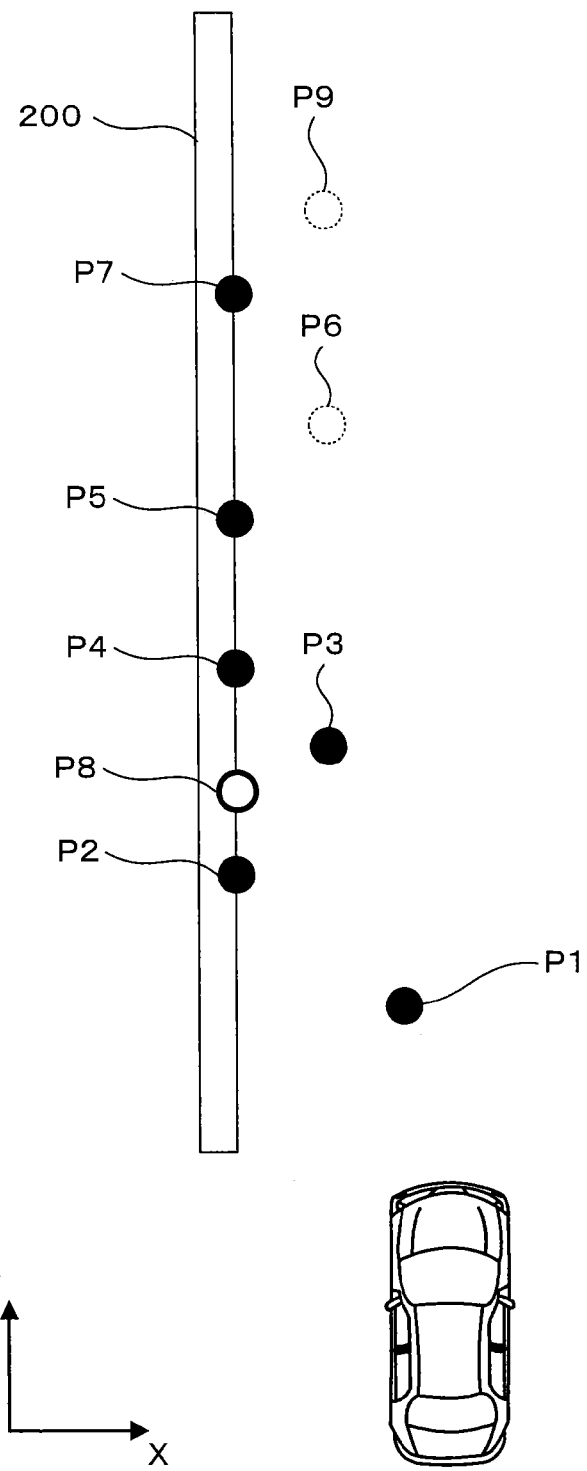
FIG. 8 illustrates a state where a portion of detected points is eliminated from starting point candidates in the reliability determination process.

FIG. 8 illustrates a state where a portion of the detected points shown in FIG. 5 is eliminated from the starting point candidates in the reliability determination process described above. FIG. 8 illustrates a state where a portion of the detected points is eliminated from the starting point candidates in the reliability determination process. In FIG. 8, the detected points P6 and P9 are eliminated from the starting point candidates. Thus, in the reliability determination process, a detected point determined as being less likely to represent a roadside stationary object based on the change of the previous position is eliminated from the starting point candidates, and detected points determined as being likely to represent a roadside stationary object can be set as the starting point candidates.

Returning to the description with reference to FIG. 6, in step S32, the region determination section 131 eliminates, from the starting point candidates, the detected points which are inside the elimination region Aex. The elimination region Aex is a region that extends forward of the own vehicle 100 like a band, and favorably has a width that is greater than or equal to a width of the vehicle (see FIG. 9). The elimination region Aex described above is an exemplary one, and may be a region that is set in front of the vehicle so as to have any predetermined shape and size. When the region determination section 131 has completed the process step of step S32, the process is advanced to step S33.

Figure 9:
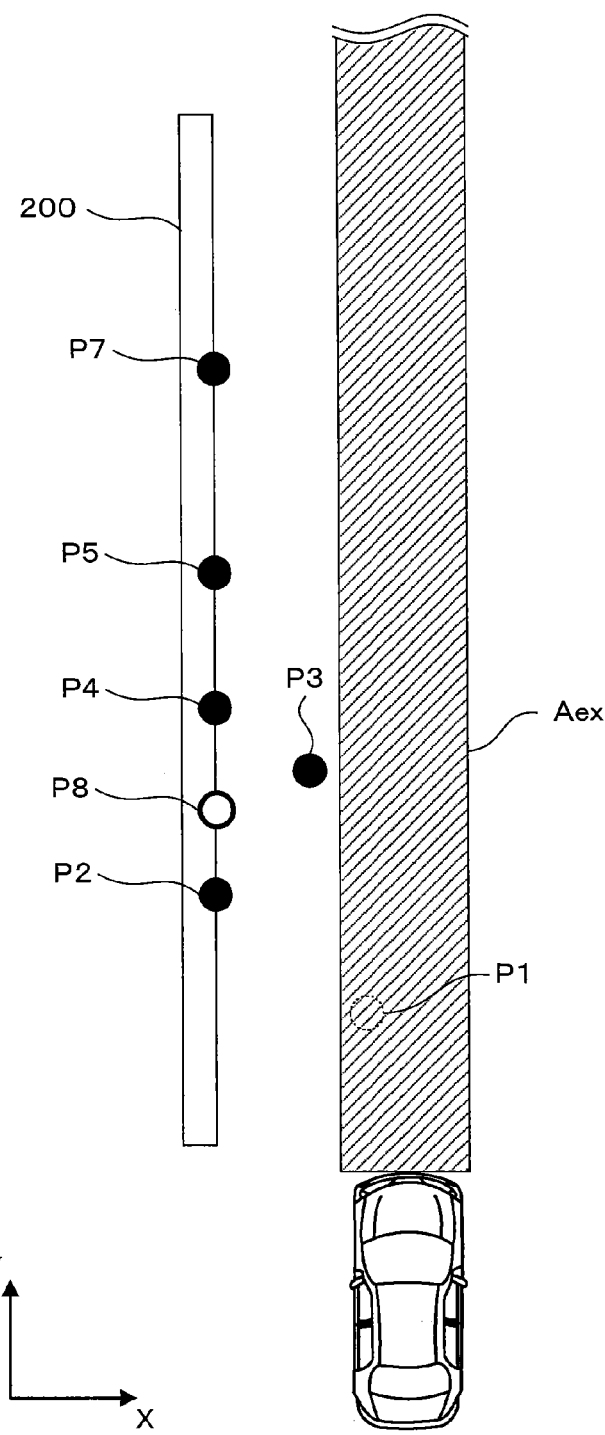
FIG. 9 illustrates a state where a portion of detected points is eliminated from starting point candidates by a region determination section 131.

FIG. 9 illustrates a state where a portion of the detected points shown in FIG. 8 is eliminated from the starting point candidates in the process step of step S32. FIG. 9 illustrates a state where a portion of the detected points is eliminated from the starting point candidates by the region determination section 131. In FIG. 9, the detected point P1 is eliminated from the starting point candidates. It can be assumed that no roadside object is in front of the own vehicle 100. Therefore, a detected point in front of the own vehicle 100 is eliminated from the starting point candidates as in step S32, to set, as the starting point candidates, only the detected points determined as being likely to represent a roadside stationary object.

In step S33, the starting point candidate selection section 129 selects a point closest to the own vehicle 100 from among the starting point candidates, and sets the point as the starting point. When the starting point candidate selection section 129 has completed the process step of step S33, the process is advanced to step S4 shown in FIG. 4.

In a case where an object has been detected continuously in a time sequence by the radar device 11, it is assumed that the detected points that are relatively closer to the vehicle are likely to more accurately represent a position of the object with reduced variation in position, as compared to the detected points that are relatively farther from the vehicle. Therefore, when the detected point that is relatively closer to the vehicle in distance is set as the starting point as in step S33, a shape of a roadside stationary object can be accurately detected and a shape of a road which may be similar to the shape of the roadside stationary object can be accurately estimated.

For example, as shown in FIG. 9, when the starting point candidates P2 to P5, P7, and P8 are set, the starting point candidate selection section 129 sets, as the starting point, the detected point P2 which is closest to the own vehicle 100, in the process step of step S33. As shown in FIG. 9, in the starting point determination process described above, the detected point representing a position at which a roadside stationary object (the guard rail 200) is actually positioned can be set as the starting point with a high probability. Thus, in the starting point determination process described above, the starting point can be appropriately set.

The starting point determination process as described above is an exemplary one. The order in which the process step of step S31 and the process step of step S32 are executed may be reversed. Further, the process step of step S31 may be omitted. In this case, the ECU 12 may not include the reliability determination section 130. Further, the process step of step S32 may be omitted. In this case, the ECU 12 may not include the region determination section 131.

In step S4, the detected point connection section 122 sets the starting point as a connection starting point. When the detected point connection section 122 has completed the process step of step S4, the process is advanced to step S5.

Figure 10:
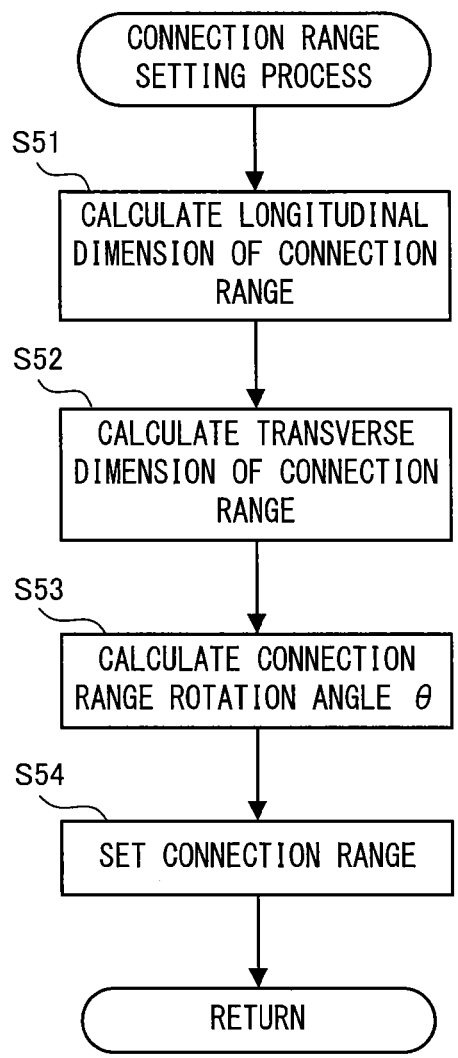
FIG. 10 is a flow chart showing in detail an exemplary connection range setting process executed by a connection range setting section 123.

In step S5, the connection range setting section 123 executes a connection range setting process. The connection range setting process is a process for setting a connection range. Hereinafter, the connection range setting process executed by the connection range setting section 123 will be described with reference to FIG. 10. FIG. 10 is a flow chart showing in detail an exemplary connection range setting process executed by the connection range setting section 123. The connection range setting section 123 firstly executes a process step of step S51 when starting the process of the flow chart shown in FIG. 10.

Figure 11:
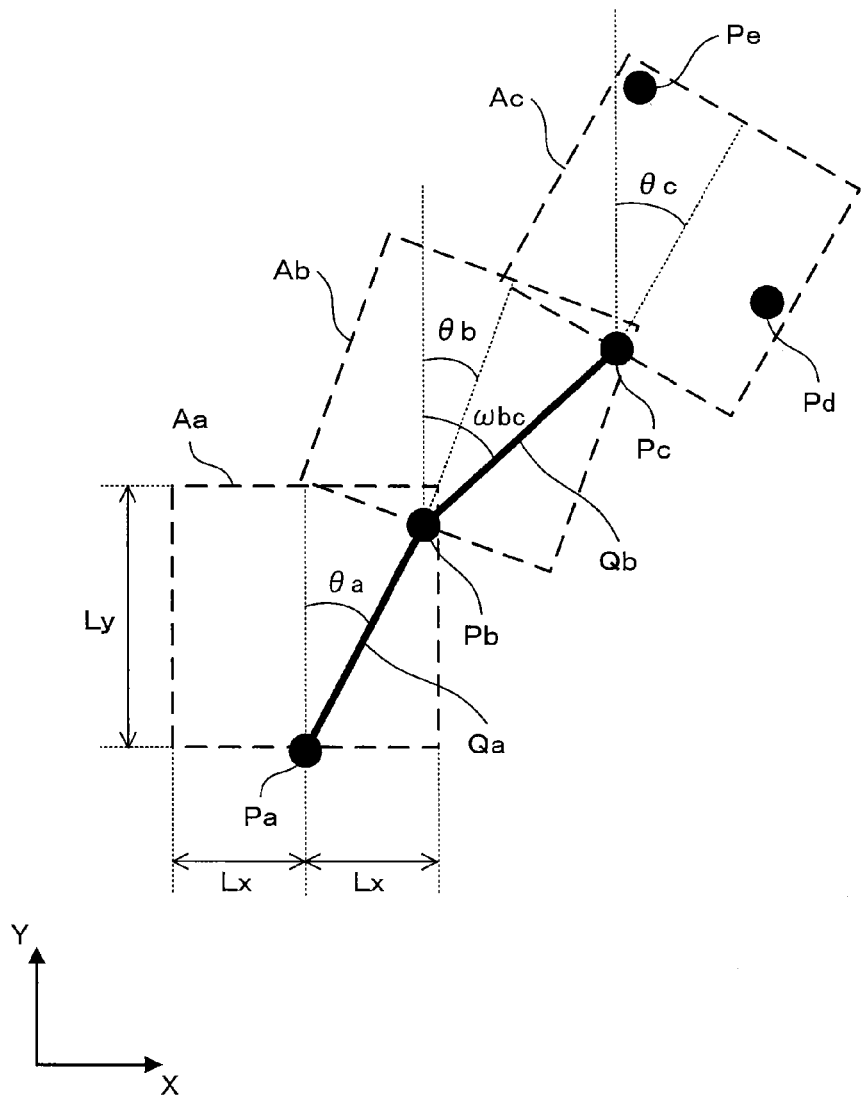
FIG. 11 illustrates a state where a connection range is set.

FIG. 11 illustrates a state where a connection range is set by the connection range setting section 123. FIG. 11 illustrates a state where a connection range is set. As shown in FIG. 11, the connection range is a rectangular region which is set based on the connection starting point.

Figure 12:
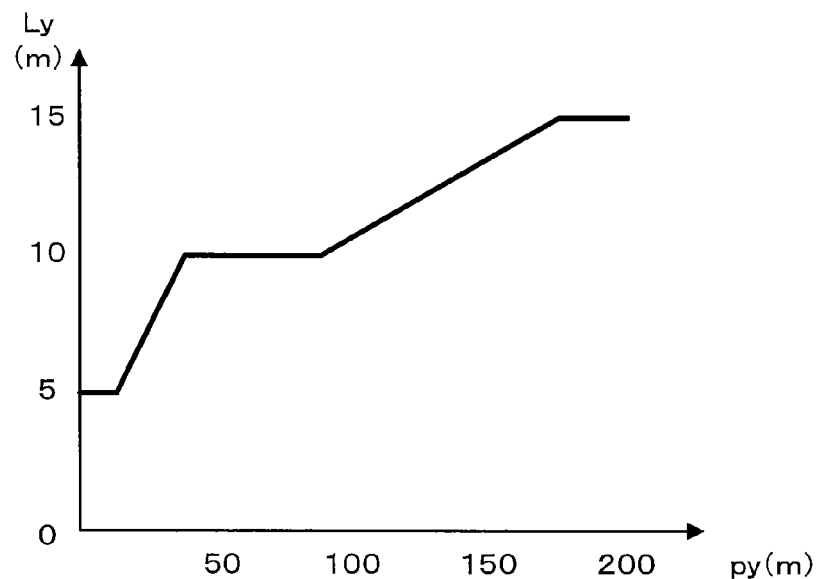
FIG. 12 shows an exemplary graph representing a function for calculating a longitudinal dimension Ly of the connection range.

In step S51, the connection range setting section 123 calculates a longitudinal dimension Ly (see FIG. 11) of the connection range. Specifically, the connection range setting section 123 calculates the longitudinal dimension Ly such that the greater a distance from the own vehicle 100 to the detected point that is the connection starting point is, the greater the longitudinal dimension Ly is. More specifically, the connection range setting section 123 calculates the longitudinal dimension Ly based on a Y-coordinate py of the connection starting point, and a predetermined function as shown in FIG. 12. FIG. 12 shows an exemplary graph representing the function for calculating the longitudinal dimension Ly of the connection range. In FIG. 12, the horizontal axis represents a Y-coordinate py of the detected point that is the connection starting point, and the vertical axis represents the longitudinal dimension Ly. When the connection range setting section 123 has completed the process step of step S51, the process is advanced to step S52.

Figure 13:
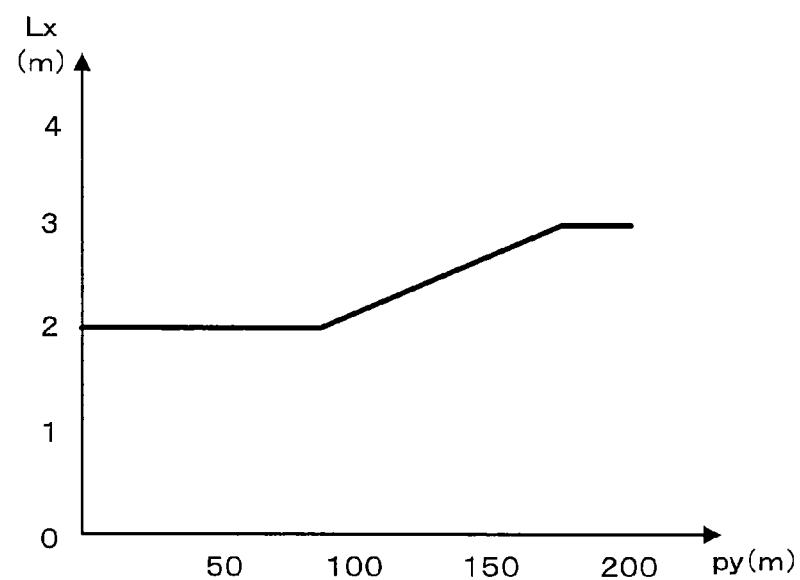
FIG. 13 shows an exemplary graph representing a function for calculating a transverse dimension Lx of the connection range.

In step S52, the connection range setting section 123 calculates a transverse dimension Lx (see FIG. 11) of the connection range. Specifically, the connection range setting section 123 calculates the transverse dimension Lx such that the greater a distance from the own vehicle 100 to the detected point that is the connection starting point is, the greater the transverse dimension Lx is. More specifically, the connection range setting section 123 calculates the transverse dimension Lx based on the Y-coordinate py of the connection starting point and a predetermined function as shown in FIG. 13. FIG. 13 shows an exemplary graph representing the function for calculating the transverse dimension Lx of the connection range. In FIG. 13, the horizontal axis represents the Y-coordinate py of the detected point that is the connection starting point, and the vertical axis represents the transverse dimension Lx. When the connection range setting section 123 has completed the process step of step S52, the process is advanced to step S53.

In the process steps of step S51 and step S52, the connection range is set such that the greater a distance to the own vehicle 100 from the detected point that is the connection starting point based on which the connection range is set is, the greater the connection range is. It is assumed that a typical radar device such as the radar device 11 has a tendency that the greater a distance to an object is, the lower an angular resolution for the object is. Namely, it is assumed that intervals at which the detected points are obtained are increased in a relatively far portion. Therefore, in a case where the detected points in a relatively far portion are connected to each other, the detected point that is a point to be connected is favorably found in a wider range as compared to in a case where the detected points in a relatively near portion are connected to each other. Therefore, as in step S51 and step S52, when a size of a range for the fining is changed according to a distance from the connection starting point to the vehicle, the detected points can be appropriately connected.

In step S53, the connection range setting section 123 calculates a connection range rotation angle θ. The connection range rotation angle θ represents a rotation amount used for rotating the connection range. The connection range setting section 123 calculates the connection range rotation angle θ according to a direction indicated by a line segment connected to the connection starting point. For example, a case is assumed where, when a detected point Pc is set as the connection starting point and Ac is set as the connection range, θc is calculated as the connection range rotation angle θ. The detected point Pc is connected, in advance, to the detected point Pb through a line segment Qb in a process step of step S8 described below. The connection range setting section 123 firstly calculates an angle ωbc between the line segment Qb and the Y-axis, based on a coordinate (cx, cy) of the detected point Pc, a coordinate (bx, by) of the detected point Pb, and equation (1).

$$\omega bc = \arctan\{(cx-bx)/(cy-by)\} \quad (1)$$

Figure 14:
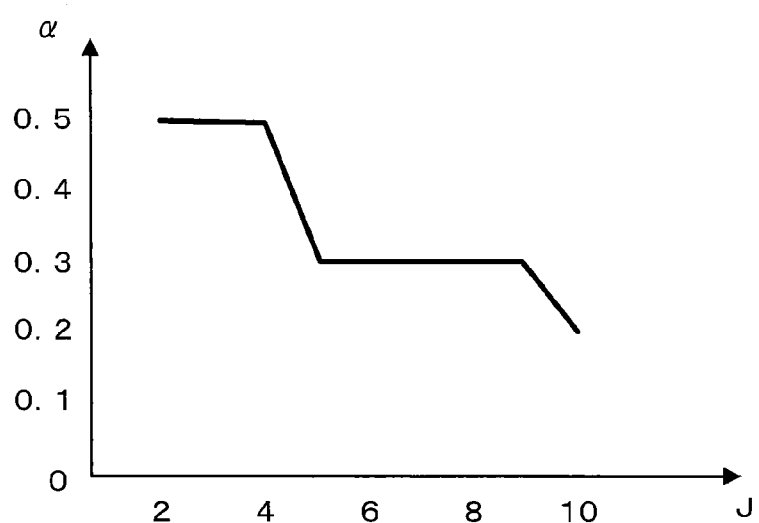
FIG. 14 shows an exemplary graph representing a function for calculating a coefficient $\alpha$.

Next, the connection range rotation angle θ which has been previously calculated when the connection range Ab is set based on the detected point Pb is represented as θb, and the connection range setting section 123 calculates θc based on ωbc, θb, and equation (2).

$$\theta c = \omega bc \times \alpha + (1-\alpha) \times \theta b \quad (2)$$

in which a coefficient α in equation (2) is greater than or equal to 0, and is not greater than 1. The connection range setting section 123 calculates the coefficient a such that the greater the number (hereinafter, referred to as a connection layer number J) of the detected points connected so as to reach the connection starting point is, the less a value of the coefficient α is. More specifically, the connection range setting section 123 calculates a value of the coefficient a based on a function shown in FIG. 14 and the number (hereinafter, referred to as the connection layer number J) of the detected points connected so as to reach the connection starting point. FIG. 14 shows an exemplary graph representing the function for calculating the coefficient α. In FIG. 14, the horizontal axis represents the connection layer number J, and the vertical axis represents the coefficient α. When the connection starting point is the starting point, the connection range setting section 123 calculates a value of the connection range rotation angle θ (θb in the exemplary case described above) as zero. When the connection range setting section 123 has completed the process step of step S53, the process is advanced to step S54.

It can be considered that a detected point near an extended line of the connection line obtained by sequentially connecting a group of the detected points is likely to represent a portion of a stationary object represented by the group of the detected points. Therefore, when the connection range is set according to a direction indicated by the line segment having been previously connected as in step S53, the detected points which are likely to represent the same stationary object are likely to be connected to each other, thereby enabling a shape of a roadside stationary object to be accurately detected.

In step S54, the connection range setting section 123 sets the connection range. Specifically, as shown in FIG. 11, the connection range setting section 123 firstly sets a side, in the transverse direction, having the transverse dimension Lx in each of the leftward direction and the rightward direction, as a length from the center corresponding to the detected point that is the connection starting point. Next, the connection range setting section 123 sets a side, in the longitudinal direction, having the longitudinal dimension Ly as a length, in the Y-axis direction, from the detected point that is the connection starting point. The connection range setting section 123 rotates, by the connection range rotation angle θ, a rectangular region surrounded by the four sides in the longitudinal direction and the transverse direction as thus set, about the detected point that is the connection starting point, to set the connection range. When the connection range setting section 123 has completed the process step of step S54, the process is advanced to step S6 shown in FIG. 4.

Figure 15:
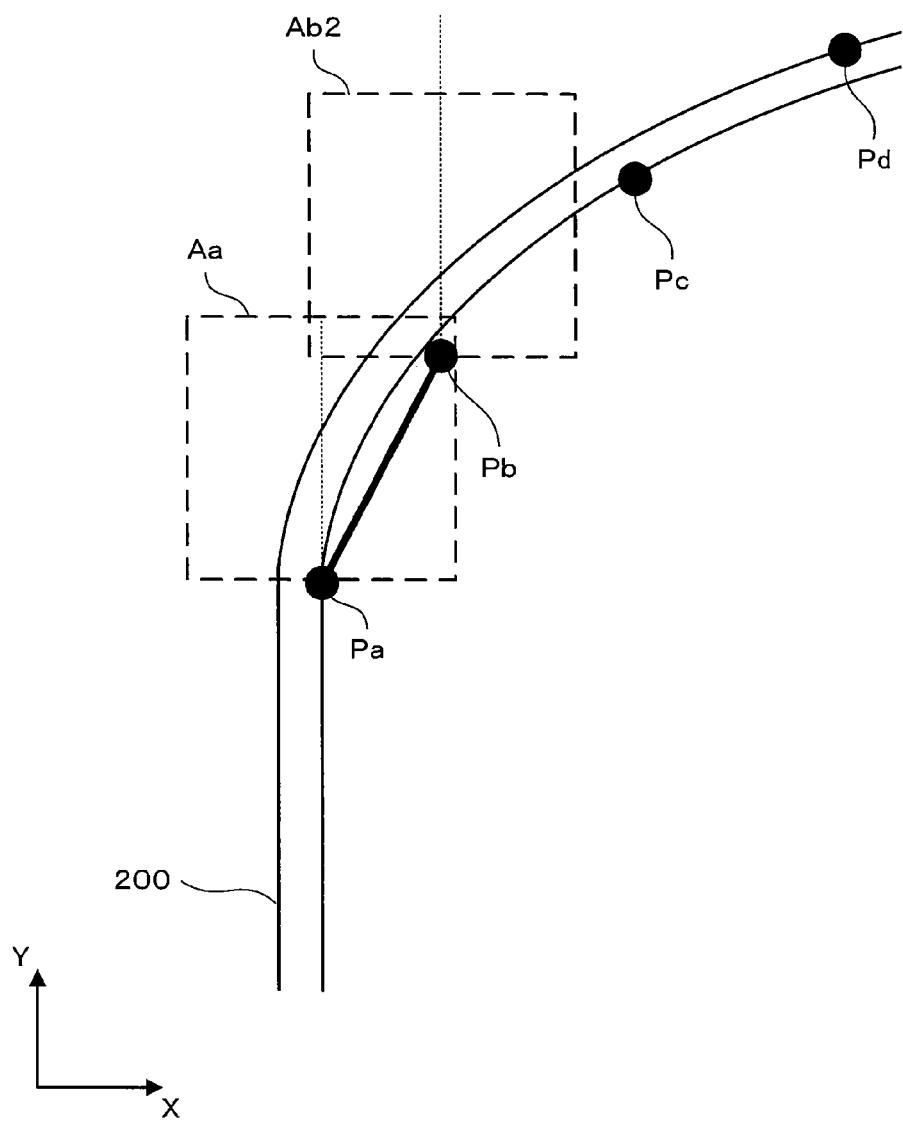
FIG. 15 shows an exemplary case where detected points are not favorably connected to each other in the case of the connection range being not rotated.

In a case where the connection range is set without performing the rotation, when the guard rail 200 is curved along a curve of the own vehicle running road as shown in FIG. 15, the detected points may not be favorably connected to each other. FIG. 15 shows an exemplary case where detected points are not favorably connected to each other in the case of the connection range being not rotated. On the other hand, in a case where the connection range is rotated as appropriate and set as describe above, even when the guard rail 200 is curved along the curve of the own vehicle running road, the detected points can be favorably connected to each other (see FIG. 11).

An exemplary case where the connection range is set as a rectangular region is described in the embodiment described above. However, the shape of the connection range is not limited to the rectangular shape, and the connection range may have any shape.

Returning to the description with reference to FIG. 4, in step S6, the point-to-be-connected selection section 124 determines whether or not a detected point is in the connection range. When the point-to-be-connected selection section 124 determines that a detected point is in the connection range, the process is advanced to step S7. On the other hand, when the point-to-be-connected selection section 124 determines that no detected point is in the connection range, the process is advanced to step S10.

In step S7, the point-to-be-connected selection section 124 selects, as the point to be connected, a detected point which is closest in distance to the connection starting point, from among the detected points in the connection range. When the point-to-be-connected selection section 124 has completed the process step of step S7, the process is advanced to step S8.

In step S8, the line segment connection section 125 connects between the connection starting point and the point to be connected as a line segment. The line segment connection section 125 may connect between the connection starting point and the point to be connected by a curved line. When the process step of step S8 has been completed, the ECU 12 advances the process to step S9.

In step S9, the line segment connection section 125 sets, as a new connection starting point, the point to be connected, which has been connected in step S8. When the line segment connection section 125 has completed the process step of step S9, the process is returned to step S5.

As described above, in the process from step S5 to step S9, the connection range can be appropriately set, so that influence of the characteristic of the radar device 11, a curve of the own vehicle running road, and the like can be restrained, to estimate a shape of the own vehicle running road with an enhanced accuracy.

In step S10, the ECU 12 determines whether or not an IG power supply of the vehicle is off. When the ECU 12 determines that the IG power supply of the vehicle is off, the process of the flow chart shown in FIG. 4 is ended. On the other hand, when the ECU 12 determines that the IG power supply of the vehicle is not off, the process is returned to step S1, and the process steps described above are repeatedly executed.

As described above, in the road shape estimation apparatus according to the present invention, the detected points are grouped by sequentially connecting between the detected points so as to start from the starting point having been appropriately determined. Therefore, the grouping process need not be performed based on all the detected points as in the conventional art. Namely, unnecessary grouping process is not performed, and an amount of process can be reduced. Therefore, a time period required for estimating a shape of a road can be shortened as compared to in conventional arts. Therefore, a shape of a road can be quickly estimated at low cost without using an expensive ECU having high processing capability.

INDUSTRIAL APPLICABILITY

The road shape estimation apparatus according to the present invention is useful as, for example, a road shape estimation apparatus capable of quickly estimating a shape of a road at low cost.

DESCRIPTION OF THE REFERENCE CHARACTERS 1 road shape estimation apparatus
11 radar device
12 ECU
50 vehicle control device
100 own vehicle
121 starting point determination section
122 detected point connection section
123 connection range setting section
124 point-to-be-connected selection section
125 line segment connection section
126 road shape estimation section
127 storage section
128 extrapolation processing section
129 starting point candidate selection section
130 reliability determination section
131 region determination section
200 guard rail

The invention claimed is:

1. A road shape estimation apparatus, mounted to a vehicle, for estimating a shape of a road on which the vehicle runs, the road shape estimation apparatus comprising:
an object detection section configured to detect, as a plurality of detected points, a position of a stationary object which is around the vehicle;
a starting point candidate selection section for selecting, as starting point candidates, points that satisfy predetermined conditions, from among the detected points;
a starting point determination section for determining, as a starting point, a point closest to the vehicle in distance, by selecting from among the starting point candidates;
a detected point connection section for sequentially connecting between the starting point and one of the detected points that is a point to be connected, so as to start from the starting point, and for thus grouping detected points;
a road shape estimation section for estimating, as a shape of the road, a shape of a connection line obtained by grouping the detected points;
a storage section configured to store information of the detected points detected by the object detection section; and
an extrapolation processing section for extrapolating, based on information of the detected points which have been previously obtained and stored in the storage section, current positions of the detected points which have been previously obtained, as the detected points, wherein the starting point candidate selection section
includes a reliability determination section for calculating a reliability representing a possibility that each detected point represents a roadside stationary object positioned along the road, based on previous positions of the detected points which are stored in the storage section, and determining whether or not the reliability represents a value greater than or equal to a predetermined threshold value, and
selects, as the starting point candidates, each detected point that satisfies, as one of the predetermined conditions, a condition that the reliability of said detected point is determined, by the reliability determination section, to represent a value greater than or equal to the predetermined threshold value, from among the detected points that have been actually detected by the object detection section, and the detected points that have been extrapolated by the extrapolation processing section,
the reliability determination section calculates the reliability of each detected point as a relatively small value when the detected points are points extrapolated by the extrapolation processing section, and
the reliability determination section calculates the reliability of each detected point as a relatively great value when the detected points are points that are actually detected by the object detection section.

2. The road shape estimation apparatus according to claim 1, wherein
the starting point candidate selection section includes a region determination section for determining whether or not the detected points are outside an elimination region that is predetermined in front of the vehicle, and
the starting point candidate selection section selects, as the starting point candidates, the detected points that satisfy, as one of the predetermined conditions, a condition that said detected points are determined, by the region determination section, to be outside the elimination region that is predetermined in front of the vehicle.

3. The road shape estimation apparatus according to claim 2, wherein the elimination region is a region that extends forward of the vehicle like a band, and that has a width greater than or equal to a width of the vehicle.

4. The road shape estimation apparatus according to claim 1, wherein
the detected point connection section includes
connection range setting section for setting a connection range in which one of the detected points is to be found as the point to be connected, based on one of the detected points that is a connection starting point, according to a position of the connection starting point,
a point-to-be-connected selection section for selecting, as the point to be connected, a point closest in distance to one of the detected points that is the connection starting point, from among the detected points in the connection range, and
a line segment connection section for connecting, as a line segment, between one of the detected points that is the connection starting point and one of the detected points that is the point to be connected, and setting the point to be connected, as a new connection starting point.

5. The road shape estimation apparatus according to claim 4, wherein the connection range setting section sets the connection range such that the greater a distance to the vehicle from one of the detected points that is a reference for setting the connection range is, the greater the connection range is.

6. The road shape estimation apparatus according to claim 4, wherein
the connection range is a rectangular region as viewed in a planar manner, and
the connection range setting section sets the connection range by rotating the connection range to be set this time, according to a direction indicated by the line segment connected to the connection starting point.

7. A road shape estimation method for estimating a shape of a road on which a vehicle runs, the road shape estimation method comprising:
an object detection step of detecting, using radar device, as a plurality of detected points, a position of a stationary object which is around the vehicle;
a starting point candidate selection step of selecting, as starting point candidates, points that satisfy predetermined conditions, from among the detected points;
a starting point determination step of determining, as a starting point, a point closest to the vehicle in distance, by selecting from among the starting point candidates;
a detected point connection step of sequentially connecting between the starting point and one of the detected points that is a point to be connected, so as to start from the starting point, and of thus grouping detected points;
a road shape estimation step of estimating, as a shape of the road, a shape of a connection line obtained by grouping the detected points;
a storing step of storing information of the detected points detected by the object detection step; and
an extrapolation processing step of extrapolating, based on information of the detected points which have been previously obtained and stored in the storing step, current positions of the detected points which have been previously obtained, as the detected points, wherein
the starting point candidate selection step
includes a reliability determination step of calculating a reliability representing a possibility that each detected point represents a roadside stationary object positioned along the road, based on previous positions of the detected points which are stored in the storing step, and determining whether or not the reliability represents a value greater than or equal to a predetermined threshold value, and
selects, as the starting point candidates, each detected point that satisfies, as one of the predetermined conditions, a condition that the reliability of said detected point is determined, by the reliability determination step, to represent a value greater than or equal to the predetermined threshold value, from among the detected points that have been actually detected by the object detection step, and the detected points that have been extrapolated by the extrapolation processing step,
the reliability determination step calculates the reliability of each detected point as a relatively small value when the detected points are points extrapolated by the extrapolation processing step, and
the reliability determination step calculates the reliability of each detected point as a relatively great value when the detected points are points that are actually detected by the object detection step.

* * * * *